United States Patent
Collier

(10) Patent No.: US 8,041,320 B2
(45) Date of Patent: Oct. 18, 2011

(54) RECEIVER FOR MULTIPLE SIGNAL SPECTRA

(75) Inventor: James Digby Yarlet Collier, Suffolk (GB)

(73) Assignee: Cambridge Silicon Radio Limited, Cambridge (GB)

( * ) Notice: Subject to any disclaimer, the term of this patent is extended or adjusted under 35 U.S.C. 154(b) by 445 days.

(21) Appl. No.: 12/380,289

(22) Filed: Feb. 25, 2009

(65) Prior Publication Data

US 2010/0009648 A1 Jan. 14, 2010

(30) Foreign Application Priority Data

Feb. 25, 2008 (GB) .................................. 0803386.2

(51) Int. Cl.
*G01S 1/00* (2006.01)
*G01S 5/14* (2006.01)
(52) U.S. Cl. ..................................... 455/168.1; 455/3.02
(58) Field of Classification Search ............... 455/168.1, 455/3.02
See application file for complete search history.

(56) References Cited

U.S. PATENT DOCUMENTS

| | | | | |
|---|---|---|---|---|
| 6,882,827 B1 * | 4/2005 | Collier | ....................... | 455/67.11 |
| 7,831,198 B2 * | 11/2010 | Kishida et al. | ............... | 455/3.02 |
| 2006/0089114 A1 * | 4/2006 | Maxim et al. | ............... | 455/179.1 |
| 2007/0066271 A1 * | 3/2007 | Vavelidis et al. | ............. | 455/333 |
| 2007/0103248 A1 * | 5/2007 | Nakamura et al. | ............ | 331/167 |
| 2008/0132191 A1 * | 6/2008 | Quinlan et al. | ............... | 455/302 |

FOREIGN PATENT DOCUMENTS

| | | |
|---|---|---|
| EP | 1 988 407 A1 | 11/2008 |
| GB | 2443961 A | 5/2008 |

* cited by examiner

*Primary Examiner* — Lincoln Donovan
*Assistant Examiner* — Ryan Jager
(74) *Attorney, Agent, or Firm* — Louis J. Franco; Law Office of Louis J. Franco

(57) ABSTRACT

A radio receiver for receiving first signals of a first frequency spectrum having principal energy in a first frequency band and second signals of a second frequency spectrum having principal energy in second and third frequency bands, located on either side of the first frequency band, includes (i) an input for receiving an incoming signal; (ii) frequency shifting means for frequency shifting the incoming signal to form an intermediate frequency signal; and (iii) a filter for filtering the intermediate frequency signal. The filter has a frequency response that has a first passband and a second passband separated by a central stopband. A control unit for controlling the frequency shifting means has first and second modes for reception of the first and second signals. In the first mode, the control unit controls the frequency shifting means so as to frequency shift the incoming signal so that (a) the first frequency band of the incoming signal is shifted onto one of the first and second passbands and (b) one of the second and third frequency bands of the incoming signal is shifted onto the central stopband. In the second mode, the control unit controls the frequency shifting means so as to frequency shift the incoming signal so that (a) the second and third frequency bands of the incoming signal are shifted onto, respectively, the first and second passbands and (b) the first frequency band of the incoming signal is shifted onto the central stopband.

18 Claims, 2 Drawing Sheets

RECEIVER FOR MULTIPLE SIGNAL SPECTRA

FOREIGN PRIORITY CLAIM

Priority based on British Patent Application Serial No. GB0803386.2 filed Feb. 25, 2008, and entitled "RECEIVER FOR MULTIPLE SIGNAL SPECTRA" is claimed. The entirety of the disclosure of the previous foreign application, including the drawings and claims, is incorporated herein by reference as if set forth fully in the present application.

BACKGROUND

The present invention relates to receivers for receiving signals having multiple signal spectra. Such a receiver may be particularly suitable for receiving signals from multiple satellite location systems, such as GPS (Global Positioning System) and Galileo.

When the Galileo system comes into operation, it will be advantageous for a locationing device to be able to make use of both the GPS and the Galileo systems. It may be that in some locations (e.g. when there is obstruction from objects such as nearby buildings) one system provides a better positional fix than the other. In locations where both systems can be received, it might be possible to improve the accuracy of a positional fix by integrating positional data from both systems.

The GPS system uses an L1 signal centred on 1575.42 MHz, and the Galileo system also uses a signal in that same area of the spectrum. FIG. 1 shows the GPS L1 spectrum (dashed line 1) and the corresponding Galileo spectrum (solid line 2). The energy of the GPS signals has a principal peak 3, with nulls on either side. The energy of the Galileo signals has two principal peaks 4 with nulls between and on either side of them. The principal peaks of the Galileo spectrum coincide with the nulls on either side of the principal GPS peak, and the principal GPS peak coincides with the central null of the Galileo spectrum. Thus, the principal energy of the GPS signal lies in a central frequency band 6 and the principal energy of the Galileo signal lies in two frequency bands 5 and 7 on either side of the central frequency band 6. The fact that both of these systems occupy a similar part of the radio spectrum means that there is potential for a receiver that is intended to receive signals from one of the systems to suffer interference from the other of the systems unless steps are taken to reject signals from the unwanted system.

A conventional GPS receiver might have a bandwidth of around 2 MHz centred around 1575.42 MHz, so that the peak 1 is passed for decoding. A corresponding Galileo receiver might have a bandwidth of around 4 MHz, also centred around 1575.42 MHz, so that the peaks 4 are passed for decoding.

If a satellite navigation device is to receive both the GPS and Galileo bands, then it could incorporate two receivers, one for each system. However, this would involve much duplication of components. A more efficient solution might be for a single receiver to have a filter that is adjustable so that the input bandwidth of the receiver can be set in dependence on the type of signals that are to be received. However, an adjustable filter is complex to implement and may have poorer performance than a static filter. Another option would be for the receiver to have two filters, either of which is switched into circuit depending on the type of signals that are to be received. However, using two filters occupies extra circuit board or integrated circuit area.

Accordingly, there exists a need for an improved mechanism for receiving GPS and Galileo signals in a single device. Similar considerations apply to other protocols whose signals are related in a similar way.

SUMMARY

According to one illustrative aspect of the present invention, there is provided a radio receiver for receiving first signals of a first frequency spectrum having principal energy in a first frequency band and second signals of a second frequency spectrum having principal energy in second and third frequency bands located on either side of the first frequency band. The receiver comprises an input for receiving an incoming signal, frequency shifting means for frequency shifting the incoming signal to form an intermediate frequency signal, and a filter for filtering the intermediate frequency signal. The filter has a frequency response that has a first passband and a second passband separated by a central stopband. A control unit for controlling the frequency shifting means has first and second modes for reception of, respectively, the first and second signals. In the first mode, the control unit controls the frequency shifting means so as to frequency shift the incoming signal so that (a) the first frequency band of the incoming signal is shifted onto one of the first and second passbands and (b) one of the second and third frequency bands of the incoming signal is shifted onto the central stopband. In the second mode, the control unit controls the frequency shifting means so as to frequency shift the incoming signal so that (a) the second and third frequency bands of the incoming signal are shifted onto the first and second passbands respectively and (b) the first frequency band of the incoming signal is shifted onto the central stopband.

Preferably, in the first mode, the whole of the first frequency band is shifted onto the said one of the first and second passbands. Moreover, it is preferred that, in the first mode, the whole of the said one of the second and third frequency bands is shifted onto the central stopband. Preferably, in the second mode, the whole of each of the second and third frequency bands is shifted onto the first and second passbands, respectively. Additionally, in the second mode, it is preferred that the whole of the first frequency band of the incoming signal is shifted onto the central stopband.

The central frequencies of the first and second passbands are preferably spaced apart by substantially the same spacing as the central frequencies of the second and third frequency bands. Additionally, the first frequency band is preferably defined so as to be coterminous with the principal energy band of the first signals and the second and third frequency bands are preferably defined so as to be coterminous with the principal energy bands of the second signals.

The first signals may have principal energy in a single central peak, while the second signals may have principal energy in two peaks symmetrically disposed about the central peak of the first signals. In addition, the first signals may be signals of a first protocol and the second signals may be signals of a second protocol different from the first protocol. In various implementations, the first and second protocols are satellite location protocols. Moreover, in some versions, the stopband of the filter may advantageously be centred on 0 Hz.

According to a second illustrative aspect of the present invention, there is provided a method for receiving first signals of a first frequency spectrum having principal energy in a first frequency band and second signals of a second frequency spectrum having principal energy in second and third frequency bands located on either side of the first frequency band by means of a comprising a filter having a frequency response that has a first passband and a second passband separated by a central stopband. An illustrative method comprises (i) receiving the first signals by frequency shifting an incoming signal so that (a) the first frequency band of the incoming signal is shifted onto one of the first and second passbands and (b) one of the second and third frequency bands of the incoming signal is shifted onto the central stopband; and (ii) receiving the second signals by frequency shifting the incoming signal so that (a) the second and third frequency bands of the incoming signal are shifted onto the first and second passbands respectively and (b) the first frequency band of the incoming signal is shifted onto the central stopband.

BRIEF DESCRIPTION OF THE DRAWINGS

Embodiments of the invention will now be described, by way of example only, with reference to the accompanying drawings in which.

DETAILED DESCRIPTION

The following description of various embodiments of a receiver for multiple signal spectra is illustrative in nature and is therefore not intended to limit the scope of the invention or its application of uses.

Figure 2:
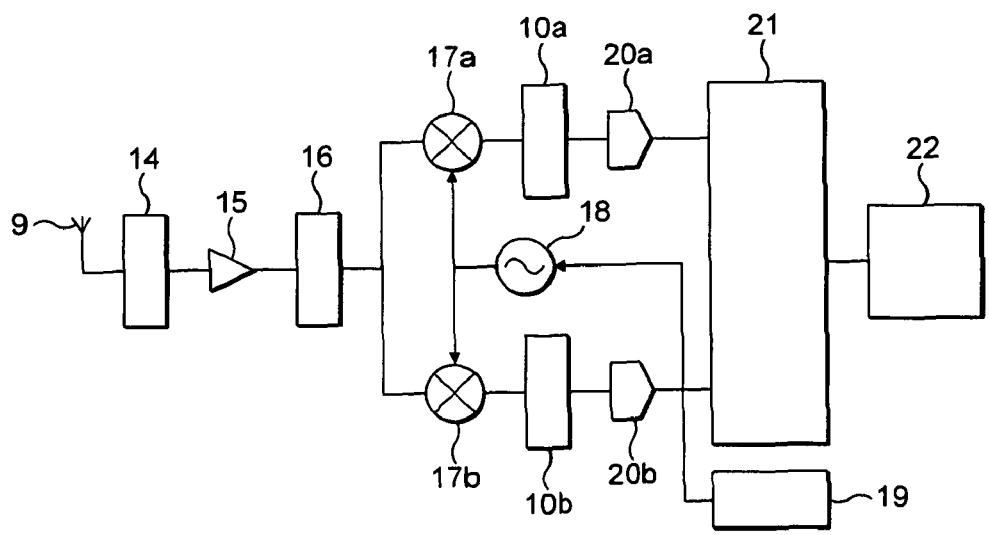
FIG. 2 illustrates the architecture of a receiver.
Figure 3:
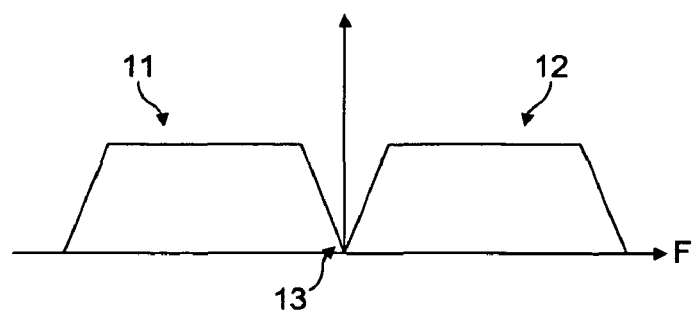
FIG. 3 illustrates the passband of the filters 10 in the receiver of FIG. 2.

Shown in FIG. 2 is a receiver for receiving GPS and Galileo signals. The receiver has intermediate frequency (IF) filters 10a and 10b which have bandwidths of around 2 MHz, each centred on a frequency of a little over 1 MHz. One preferred arrangement for the frequency response of the IF filters 10 is shown in FIG. 3. The frequency response has a lower passband 11 and an upper passband 12 with a stopband or region of relative attenuation 13 between them. When the receiver of FIG. 2 is in operation, a received signal is mixed with a local oscillator signal to shift a desired portion of the received signal into the passband(s) of the filters 10.

Figure 1:
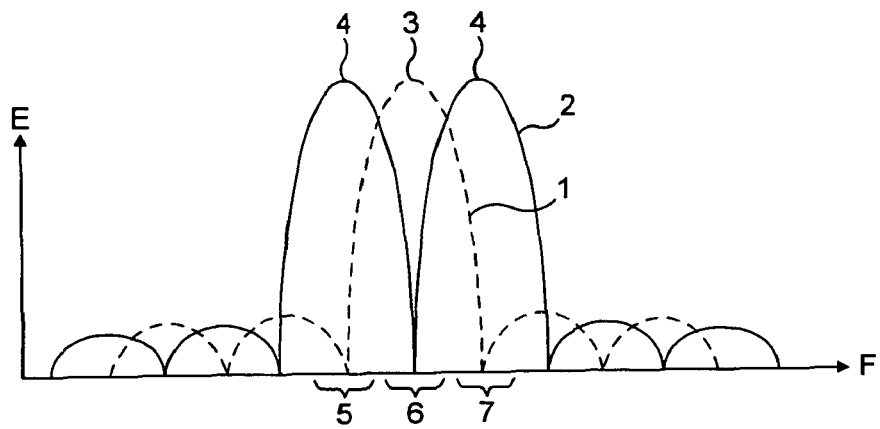
FIG. 1 shows the spectra of GPS and Galileo signals.

In the receiver of FIG. 2, the local oscillator signal has a different frequency depending on whether the receiver is to receive GPS or Galileo signals. When GPS signals are to be received, the local oscillator is controlled so as to generate a signal of a frequency that translates the main (principal) GPS band 3 (FIG. 1) on to either one of the upper and lower passband of the filters 10. This causes the energy peaks of the main Galileo band to fall on either side of that passband and hence to be attenuated relative to the GPS signals. When Galileo signals are to be received, the local oscillator is controlled so as to generate a signal of a frequency that translates the main Galileo band 4 across both the upper and lower passbands of the filters 10. This causes the energy peak of the main GPS band to fall on the stopband of the filter 10 that lies around 0 Hz.

The illustrative receiver of FIG. 2 will now be described in more detail. The receiver comprises an antenna 9 for receiving radio frequency signals. The antenna 9 is preferably optimized for receiving signals in the 1.5 GHz range, where GPS and Galileo lie. The output of the antenna 9 may be filtered by an input filter 14. It is then amplified by a low noise amplifier 15 and may then be filtered by a second input filter 16. The filters 14 and 16 could be omitted if the selectivity of the other components, especially the antenna 9, is adequate. The resulting signal is split and passes to two mixers 17a and 17b. A local oscillator 18 generates in-phase (I) and quadrature (Q) local oscillator signals which have the same frequency but are offset in phase by 90°. The frequency of the local oscillator 18 is set by a control unit 19. Each of the local oscillator signals passes to a respective one of the mixers 17a and 17b, where it is mixed with the incoming radio signal to effectively frequency-shift the incoming signal by forming a signal at the difference between the frequency of the local oscillator signal and the incoming signal. The signals that are output from the mixers 17a and 17b are filtered by one of the IF filters 10a and 10b, respectively. The outputs of the filters 10a and 10b are digitized by respective analogue-to-digital converters 20a and 20b, and the resulting digital signals are processed by digital signal processor (DSP) 21 to demodulate the received signals and, thereby, recover the data carried in the received signals. That data is then passed to a location estimation unit 22 which performs the GPS or Galileo trilateration/multilateration calculations to form an estimate of the receiver's position.

FIG. 3 illustrates the frequency response of the filters 10a and 10b. The filters 10a and 10b have substantially the same frequency response. The upper passband (USB) 12 of the filters 10a and 10b extends from around +0.3 MHz to +2.7 MHz, rolling off to pass substantially no energy around 0.3 MHz outside that band. The frequency response is symmetrical about DC, so the filter has a corresponding lower passband (LSB) 11 that extends from around −2.7 MHz to −0.3 MHz, rolling off to pass substantially no energy around 0.3 MHz outside the LSB. The central stopband is considered to be the region from −0.3 MHz to +0.3 MHz. The filter could have a similar form to that of FIG. 3 but not centred on DC, although that would be more complex to implement.

The local oscillator (LO) 18 is conveniently a voltage-controlled oscillator. The frequency of the oscillator 18 is dependent on an input received by the oscillator 18 from the control unit 19. The control unit 19 controls the operations of the receiver. The control unit 19 is "aware" of whether the receiver is to operate in a mode for GPS reception or a mode for Galileo reception. It may determine this itself based on a pre-programmed control algorithm or it may receive commands from another controller that dictate which mode the receiver is to operate in. When the receiver is to operate in GPS mode, the controller 19 signals the DSP 21 to execute an algorithm for demodulating and decoding GPS signals and signals the local oscillator 18 to operate with a first frequency, the selection of which will be discussed in more detail below. When the receiver is to operate in Galileo mode, the controller 19 signals the DSP 21 to execute an algorithm for demodulating and decoding Galileo signals and signals the local oscillator 18 to operate with a second frequency, the selection of which will be discussed in more detail below.

Figure 4:
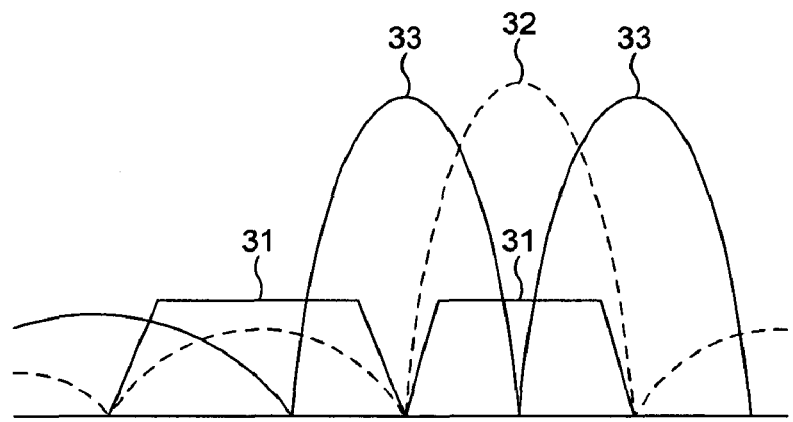
FIG. 4 illustrates the relationship of frequencies for GPS reception.

The first frequency (i.e. the LO frequency used for GPS reception) is selected so as to shift the main band 6 (FIG. 1) of the GPS signals so that it lies in either the upper or lower passband of the filters 10a and 10b, whilst the peaks of the Galileo spectrum lie in nulls of the filters 10a and 10b. This is illustrated in FIG. 4, in which the filter response is shown at 31, the GPS spectrum is shown at 32 and the Galileo spectrum is shown at 33. If the filters 10a and 10b are centred on a frequency $f_F$ so that the passbands extend from $f_F \pm 0.3$ MHz to $f_F \pm 2.7$ MHz, then preferred local oscillator frequencies when operating in GPS mode are around $f_F + 1.5$ MHz $\pm 1575.42$ MHz if the band 3 is to fall in the USB and around $f_F$−1.5 MHz ±1575.42 MHz if the band 3 is to fall in the LSB.

Figure 5:
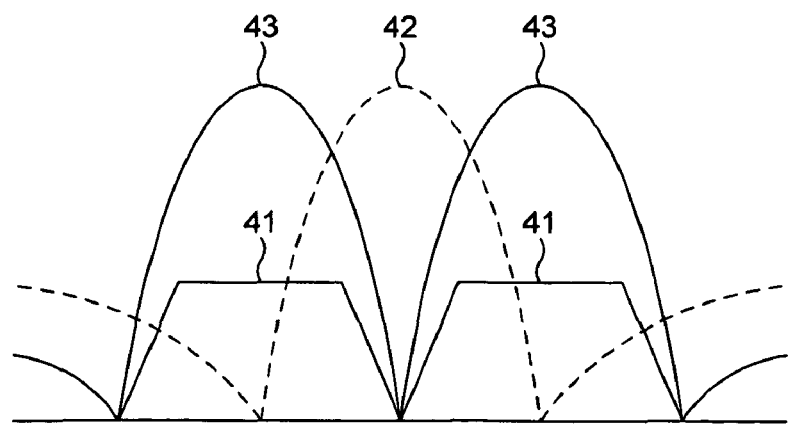
FIG. 5 illustrates the relationship of frequencies for Galileo reception.

The second frequency (i.e. the LO frequency used for Galileo reception) is selected so as to shift the main bands 5 and 7 (FIG. 1) of the Galileo signals so that they each lie in a respective one of the upper and lower passbands of the filters 10a and 10b, whilst the peak of the GPS spectrum lies in the central null of the filters 10a and 10b around DC. This is illustrated in FIG. 5, in which the filter response is shown at 41, the GPS spectrum is shown at 42 and the Galileo spectrum is shown at 43. If the filters 10a and 10b are centred on a frequency $f_F$ so that the passbands extend from $f_F$±0.3 MHz to $f_F$±2.7 MHz, then preferred local oscillator frequencies when operating in Galileo mode are around $f_F$±1575.42 MHz.

In this way, the filters 10a and 10b can remain unchanged, whether the receiver is receiving GPS or Galileo signals, and there is no need to provide separate filters for GPS and Galileo reception. This means that the filters 10 can be of relatively simple design, occupying relatively little area on a circuit board or an integrated circuit, and consuming relatively little power.

Some or all of the components of the receiver may be implemented on a single integrated circuit. Preferably all of the components shown in FIG. 2, or all of those components apart from the antenna 9, can be implemented in a single integrated circuit.

The receiver may be capable of receiving other signals using some or all of the same components. In particular, the local oscillator 18 may be used to generate signals for mixing with signals of one or more other protocols for mixing them down to an intermediate frequency, and the filters 10a and 10b may be used for selecting channels in one or more other protocols. Such other protocols could include Bluetooth, GSM, 802.11 and 3G, by way of non-limiting example.

The receiver could be implemented in a dedicated positioning device or a device that performs other functions. Examples non-dedicated devices include mobile phones, vehicle tracking devices and location-aware cameras. The receiver could be implemented on a single integrated circuit.

Similar principles could be used for receiving signals from other pairs of systems. Implementations of the invention are most effective when a first one of the systems has its principal energy confined to a first frequency band, and a second one of the systems has its principal energy in two zones spaced in frequency on either side of the first frequency band. Moreover, implementations of the invention is most effective if the bandwidth of each of those two zones is at least roughly the same as the width of the first frequency band, and if the zones are at least roughly equally spaced from the centre of the first frequency band, as is the relationship for GPS and Galileo signals.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention as defined in the appended claims.

What is claimed is:

1. A radio receiver for receiving first signals of a first frequency spectrum having principal energy in a first frequency band and second signals of a second frequency spectrum having principal energy in second and third frequency bands located on either side of the first frequency band, the receiver comprising:
   an input for receiving an incoming signal;
      frequency shifting means for frequency shifting the incoming signal to form an intermediate frequency signal; and
      a filter for filtering the intermediate frequency signal, the filter having a frequency response that has a first passband and a second passband separated by a central stopband; and
      a control unit for controlling the frequency shifting means, the control unit having:
         a first mode for reception of the first signals, in which it controls the frequency shifting means so as to frequency shift the incoming signal so that (a) the first frequency band of the incoming signal is shifted onto one of the first and second passbands and (b) one of the second and third frequency bands of the incoming signal is shifted onto the central stopband; and
         a second mode for reception of the second signals, in which it controls the frequency shifting means so as to frequency shift the incoming signal so that (a) the second and third frequency bands of the incoming signal are shifted onto the first and second passbands respectively and (b) the first frequency band of the incoming signal is shifted onto the central stopband.

2. A radio receiver as claimed in claim 1, wherein, in the first mode, the whole of the first frequency band is shifted onto the said one of the first and second passbands.

3. A radio receiver as claimed in claim 2, wherein, in the first mode, the whole of the said one of the second and third frequency bands is shifted onto the central stopband.

4. A radio receiver as claimed in claim 2, wherein, in the second mode, the whole of each of the second and third frequency bands is shifted onto, respectively, the first and second passbands.

5. A radio receiver as claimed in claim 1, wherein, in the first mode, the whole of the said one of the second and third frequency bands is shifted onto the central stopband.

6. A radio receiver as claimed in claim 1, wherein, in the second mode, the whole of each of the second and third frequency bands is shifted onto, respectively, the first and second passbands.

7. A radio receiver as claimed in claim 6, wherein, in the second mode, the whole of the first frequency band of the incoming signal is shifted onto the central stopband.

8. A radio receiver as claimed in claim 7, wherein the second and third frequency bands are coterminous with the principal energy bands of the second signals.

9. A radio receiver as claimed in claim 1, wherein, in the second mode, the whole of the first frequency band of the incoming signal is shifted onto the central stopband.

10. A radio receiver as claimed in claim 9, wherein the central frequencies of the first and second passbands are spaced apart by substantially the same spacing as the central frequencies of the second and third frequency bands.

11. A radio receiver as claimed in claim 1, wherein the central frequencies of the first and second passbands are spaced apart by substantially the same spacing as the central frequencies of the second and third frequency bands.

12. A radio receiver as claimed in claim 1, wherein the first frequency band is coterminous with the principal energy band of the first signals.

13. A radio receiver as claimed in claim 1, wherein the second and third frequency bands are coterminous with the principal energy bands of the second signals.

14. A radio receiver as claimed in claim 1, wherein the first signals have principal energy in a single central peak and the second signals have principal energy in two peaks symmetrically disposed about the central peak of the first signals.

15. A radio receiver as claimed in claim 1, wherein the first signals are signals of a first protocol and the second signals are signals of a second protocol.

16. A radio receiver as claimed in claim 15, wherein the first and second protocols are satellite location protocols.

17. A radio receiver as claimed in claim 1, wherein the stopband is centered on 0 Hz.

18. A method for receiving first signals of a first frequency spectrum having principal energy in a first frequency band and second signals of a second frequency spectrum having principal energy in second and third frequency bands located on either side of the first frequency band by means of a comprising a filter having a frequency response that has a first passband and a second passband separated by a central stopband; the method comprising:
    receiving the first signals by frequency shifting an incoming signal so that (a) the first frequency band of the incoming signal is shifted onto one of the first and second passbands and (b) one of the second and third frequency bands of the incoming signal is shifted onto the central stopband; and
    receiving the second signals by frequency shifting the incoming signal so that (a) the second and third frequency bands of the incoming signal are shifted onto the first and second passbands respectively and (b) the first frequency band of the incoming signal is shifted onto the central stopband.

\* \* \* \* \*